United States Patent
Zhang et al.

(10) Patent No.: US 10,569,874 B2
(45) Date of Patent: Feb. 25, 2020

(54) FLIGHT CONTROL METHOD AND APPARATUS

(71) Applicant: Xiaomi Inc., Beijing (CN)

(72) Inventors: Pengfei Zhang, Beijing (CN); Wei Cai, Beijing (CN); Yongfeng Xia, Beijing (CN); Hualin Ye, Beijing (CN)

(73) Assignee: Xiaomi Inc., Beijing (CN)

( * ) Notice: Subject to any disclaimer, the term of this patent is extended or adjusted under 35 U.S.C. 154(b) by 221 days.

(21) Appl. No.: 15/722,001

(22) Filed: Oct. 2, 2017

(65) Prior Publication Data
US 2018/0022454 A1 Jan. 25, 2018

Related U.S. Application Data

(63) Continuation of application No. PCT/CN2016/083729, filed on May 27, 2016.

(30) Foreign Application Priority Data

May 28, 2015 (CN) .......................... 2015 1 0284823

(51) Int. Cl.
*B64C 39/02* (2006.01)
*G05D 1/00* (2006.01)

(52) U.S. Cl.
CPC .......... *B64C 39/024* (2013.01); *G05D 1/0011* (2013.01); *G05D 1/0016* (2013.01); *B64C 2201/141* (2013.01); *B64C 2201/146* (2013.01)

(58) Field of Classification Search
CPC ............ B64C 39/024; B64C 2201/146; B64C 2201/141; G05D 1/001; G05D 1/0016;
(Continued)

(56) References Cited

U.S. PATENT DOCUMENTS 5,552,983 A 9/1996 Thornberg et al.
6,857,601 B2 2/2005 Akahori
(Continued)

FOREIGN PATENT DOCUMENTS

CA 2773702 A1 11/2005
CN 1464856 A 12/2003
(Continued)

OTHER PUBLICATIONS

Russian Office Action issued in Russian Patent Application No. 2017102706/11(004709), dated Mar. 6, 2018.
(Continued)

*Primary Examiner* — Dale Moyer
(74) *Attorney, Agent, or Firm* — Finnegan, Henderson, Farabow, Garrett & Dunner, L.L.P.

(57) ABSTRACT

A flight control method includes: determining a positional relationship between an aircraft and a control device; determining a polar coordinate system with the control device as an origin according to the positional relationship; receiving a flight direction control instruction sent by the control device, the flight direction control instruction being generated on the basis of the polar coordinate system; and driving, according to coordinate information about the aircraft in the polar coordinate system, the aircraft to fly in accordance with the flight direction control instruction.

15 Claims, 13 Drawing Sheets

(58) Field of Classification Search
CPC .. G05D 1/0033; G05D 1/0038; G05D 1/0202; G05D 1/10
See application file for complete search history.

(56) References Cited

U.S. PATENT DOCUMENTS

| | | | |
|---|---|---|---|
| 7,672,761 | B2 | 3/2010 | Wrage et al. |
| 8,014,909 | B2 | 9/2011 | Builta et al. |
| 8,108,085 | B2 | 1/2012 | Builta et al. |
| 2003/0025034 | A1 | 2/2003 | Akahori |
| 2004/0232285 | A1 | 11/2004 | Akahori |
| 2007/0021878 | A1 | 1/2007 | Builta et al. |
| 2007/0250226 | A1 | 10/2007 | Wrage et al. |
| 2008/0243371 | A1 | 10/2008 | Builta et al. |
| 2009/0204276 | A1* | 8/2009 | Stuckman ............... A63H 27/12 701/2 |
| 2011/0270474 | A1 | 11/2011 | Builta et al. |
| 2014/0371952 | A1* | 12/2014 | Ohtomo ............... B64C 39/024 701/2 |
| 2015/0142211 | A1 | 5/2015 | Shehata et al. |
| 2016/0327950 | A1* | 11/2016 | Bachrach ............. G05D 1/0016 |
| 2017/0293298 | A1* | 10/2017 | Song ..................... G05D 1/0022 |

FOREIGN PATENT DOCUMENTS

| | | | |
|---|---|---|---|
| CN | 1934562 | A | 3/2007 |
| CN | 101046387 | A | 10/2007 |
| CN | 101206260 | A | 6/2008 |
| CN | 102393641 | A | 3/2012 |
| CN | 103176475 | A | 6/2013 |
| CN | 103728637 | A | 4/2014 |
| CN | 103995968 | A | 8/2014 |
| CN | 104898699 | A | 9/2015 |
| CN | 105793792 | A | 7/2016 |
| EP | 2511781 | A1 | 10/2012 |
| EP | 2818958 | A2 | 12/2014 |
| JP | H 09-510032 | A | 10/1997 |
| JP | 2001-209427 | A | 8/2001 |
| JP | 2003-202922 | A | 7/2003 |
| JP | 2003-308120 | A | 10/2003 |
| JP | 2007-122580 | A | 5/2007 |
| JP | 2007-532408 | A | 11/2007 |
| JP | 2012-71690 | A | 4/2012 |
| JP | 2013-33379 | A | 2/2013 |
| JP | 2013-144539 | A | 7/2013 |
| JP | 2014-145604 | A | 8/2014 |
| JP | 2015-1450 | A | 1/2015 |
| JP | 2018-504690 | A | 2/2018 |
| RU | 2059976 | C1 | 5/1996 |
| RU | 2369521 | C2 | 10/2009 |
| RU | 120077 | U1 | 9/2012 |
| WO | WO 95/24004 | A1 | 9/1995 |
| WO | WO 03/004352 | A1 | 1/2003 |
| WO | WO 2013/163746 | A1 | 11/2013 |
| WO | WO 2016/101227 | A1 | 6/2016 |

OTHER PUBLICATIONS

Korea Office Action issued in Korean Patent Application No. 10-2017-7004818, dated May 9, 2018.
English version of International Search Report and Written Opinion of PCT/CN2016/083729, mailed from the State Intellectual Property Office of China dated Jul. 26, 2016.
First Office Action issued in Japanese Patent Application No. 2016-573059 , mailed from Japan Patent Office, dated Sep. 20, 2017.
Extended European Search Report issued in European Patent Application No. 16799373.2, dated May 24, 2018.
Second Office Action issued in Japanese Patent Application No. 2016-573059, mailed from japan Patent Office, dated Jun. 5, 2018.

* cited by examiner

FLIGHT CONTROL METHOD AND APPARATUS

CROSS-REFERENCE TO RELATED APPLICATIONS

This application is a continuation application of International Application No. PCT/CN2016/083729, filed May 27, 2016, which is based upon and claims priority to Chinese Patent Application No. 201510284823.6, filed on May 28, 2015, the entire contents of all of which are incorporated herein by reference.

TECHNICAL FIELD

The present disclosure generally relates to the technical field of aircraft control and, more particularly, to a flight control method and apparatus.

BACKGROUND

Aircrafts can be utilized in many fields, such as aerial photography, transportation of articles and the like. Drone aircrafts are of a low cost, small size, high flexibility and the like. A user may control the flight of a drone aircraft through a remote control device that communicates with the drone aircraft wirelessly.

SUMMARY

According to a first aspect of the present disclosure, there is provided a flight control method. The method includes: determining a positional relationship between an aircraft and a control device; determining a polar coordinate system with the control device as an origin according to the positional relationship; receiving a flight direction control instruction sent by the control device, the flight direction control instruction being generated on the basis of the polar coordinate system; and driving, according to coordinate information about the aircraft in the polar coordinate system, the aircraft to fly in accordance with the flight direction control instruction.

According to another aspect of the present disclosure, there is provided an apparatus. The apparatus includes a processor and a memory configured to store instructions executable by the processor. The processor is configured to: determine a positional relationship between an aircraft and a control device; determine a polar coordinate system with the control device as an origin according to the positional relationship; receive a flight direction control instruction sent by the control device, the flight direction control instruction being generated on the basis of the polar coordinate system; and drive, according to coordinate information about the aircraft in the polar coordinate system, the aircraft to fly in accordance with the flight direction control instruction.

According to another aspect of the present disclosure, there is provided a non-transitory computer-readable storage medium having stored therein instructions that, when executed by a processor, cause the processor to perform a flight control method, the method including: determining a positional relationship between an aircraft and a control device; determining a polar coordinate system with the control device as an origin according to the positional relationship; receiving a flight direction control instruction sent by the control device, the flight direction control instruction being generated on the basis of the polar coor-dinate system; and driving, according to coordinate information about the aircraft in the polar coordinate system, the aircraft to fly in accordance with the flight direction control instruction.

It will be appreciated that the above general descriptions and the following detailed descriptions are merely exemplary and explanatory, and cannot limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of devices and methods consistent with aspects related to the embodiments of the present disclosure as recited in the appended claims.

Figure 1:
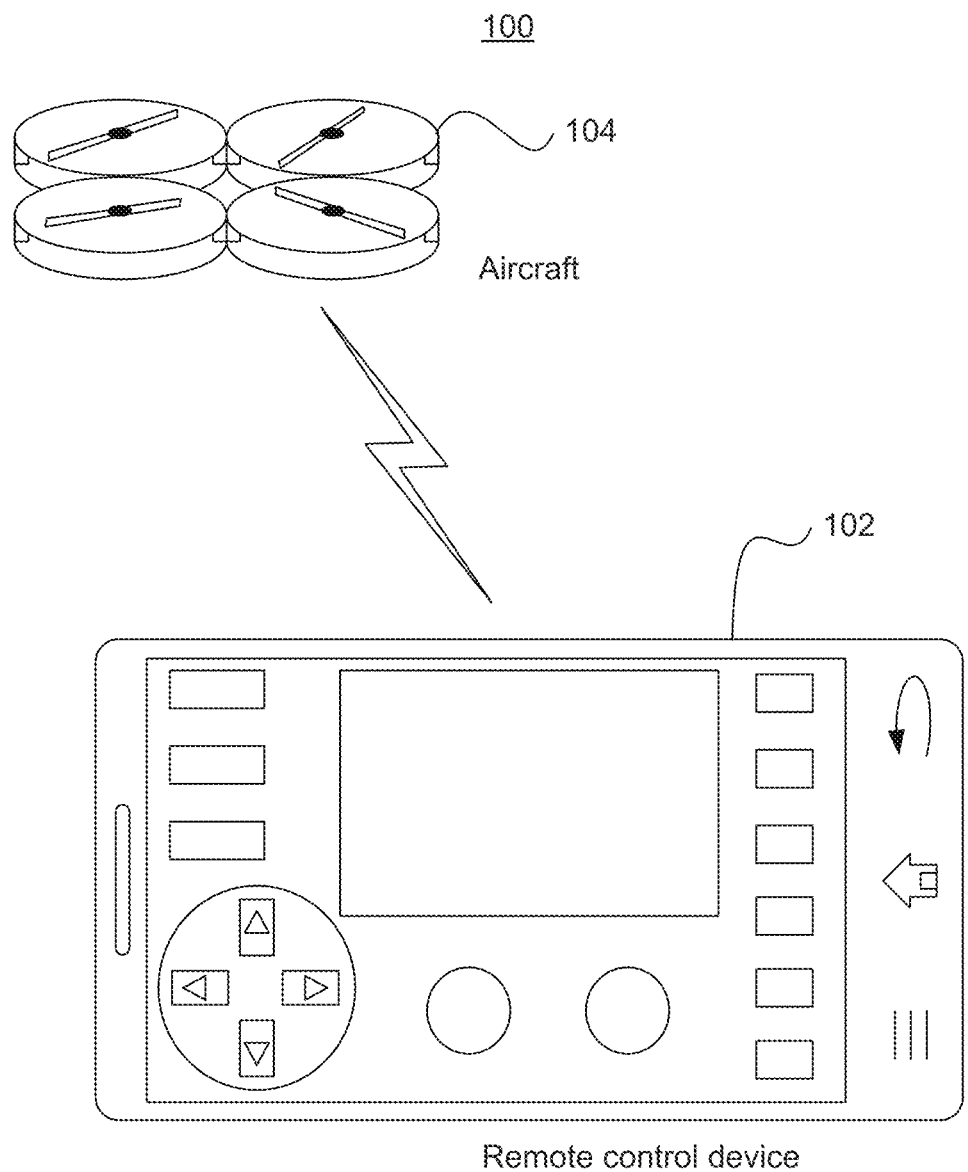
FIG. 1 is a schematic diagram illustrating a flight control system according to an exemplary embodiment.

FIG. 1 is a schematic diagram illustrating a flight control system 100 according to an exemplary embodiment of the present disclosure. As shown in FIG. 1, the flight control system 100 includes a remote control device 102 and an aircraft 104, such as a drone aircraft. The remote control device 102 and the aircraft 104 communicate with each other wirelessly. After a user sends a control instruction to the aircraft 104 via the remote control device 102, the aircraft 104 can be controlled to fly.

In the relevant art, when a user sends a control instruction, particularly a flight direction control instruction, to the aircraft via a remote control device, the user controls the flight of the aircraft from a perspective of the aircraft. For instance, when the flight direction control instruction indicates a leftward flight, it shall be interpreted that the aircraft turns to the left side of the aircraft. However, when the aircraft flies far away from the user, it is difficult for the user to observe the orientation of the aircraft. Or when the aircraft has a four-axis structure shown in FIG. 1, the user often cannot determine real-time positions of the aircraft, thereby making it difficult to implement control from a perspective of the aircraft.

The embodiments of the present disclosure, by improving the flight control over the aircraft, solve the above technical problems in the relevant art.

Figure 2:
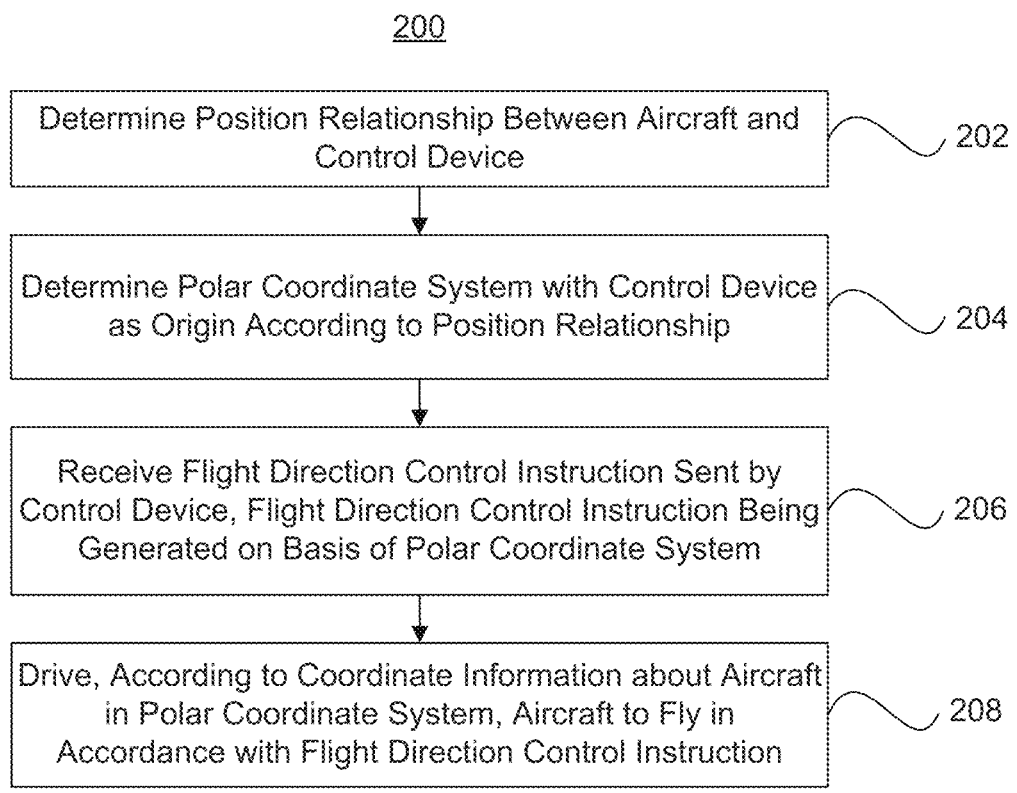
FIG. 2 is a flow chart showing a flight control method according to an exemplary embodiment.

FIG. 2 is a flow chart showing a flight control method 200 according to an exemplary embodiment of the present disclosure. As shown in FIG. 2, the method 200 is performed by an aircraft, such as the aircraft 104 shown in FIG. 1, and may include the steps as follows.

In Step 202, a positional relationship between the aircraft 104 and the control device 102 is determined.

In one embodiment, the aircraft 104 may acquire the positional relationship in a preset time period. In one embodiment, the aircraft 104 may acquire the positional relationship when receiving a flight direction control instruction.

In Step 204, a polar coordinate system with the control device 102 as an origin is determined or acquired by the aircraft 104 according to the positional relationship.

In Step 206, a flight direction control instruction sent by the control device 102 is received. The flight direction control instruction is generated on the basis of the polar coordinate system.

In the present embodiment, the control device 102 sends data such as the flight direction control instruction and other types of instructions or information to the aircraft 104 via a signal transceiver device. The signal transceiver device may be integrated in the remote control device 102. Data transmission may be implemented between the aircraft 104 and the remote control device 102 in any wireless manner, such as WiFi or Bluetooth, and the present disclosure is not limited by the examples above.

In the illustrated embodiment, because the flight direction control instruction is generated on the basis of the polar coordinate system and the origin of the polar coordinate system is located at the control device 102, the aircraft 104 is controlled when the control device 102 is at a center location without considering a real-time attitude (such as orientation) of the aircraft 104. The aircraft 104 may be self-adjusted according to a target direction corresponding to the flight direction control instruction.

In Step 208, according to coordinate information about the aircraft in the polar coordinate system, the aircraft 104 is driven to fly in accordance with the flight direction control instruction.

Figure 3:
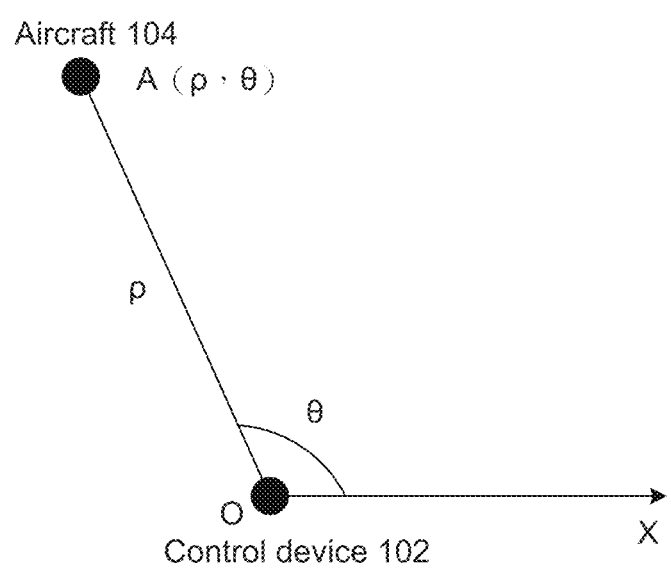
FIG. 3 is a schematic diagram illustrating a coordinate relationship for flight control according to an exemplary embodiment.

FIG. 3 is a schematic diagram illustrating a coordinate relationship between a control device 102 and an aircraft 104 for flight control according to an exemplary embodiment. As shown in FIG. 3, the control device 102 is located at a point O, and a polar coordinate system OX with the point O as an origin is established. The aircraft 104 may obtain coordinate information about itself in the polar coordinate system OX according to the positional relationship between the aircraft 104 and the control device 102. The aircraft 104 is located at a point A having coordinate information of $(\rho, \theta)$, where $\rho$ is the distance between the control device 102 and the aircraft 104, and $\theta$ is the angle between X-axis OX and line OA. In the illustrated embodiment, to control the flight of the aircraft 104, it is not required to consider the real-time attitude of the aircraft 104. The control device 102 may send a flight direction control instruction to the aircraft 104 based on the polar coordinate system in which the control device 102 is located at the origin. After receiving the flight direction control instruction, the aircraft 104 transforms the flight direction control instruction into direction information in an aircraft coordinate in which the aircraft 104 is located at the origin. For instance, the aircraft 104 may transform a target direction corresponding to the flight direction control instruction from the polar coordinate system to a flight coordinate system of the aircraft 104 and flies according to the transformed target direction.

In some embodiments, the flight direction control instruction is configured to control a flight direction of the aircraft 104, including, e.g., a forward direction, a backward direction, a leftward direction and a rightward direction in a plane, and excluding, e.g., an upward direction and a downward direction in a three-dimensional space.

In the illustrated embodiments, by transforming a target direction corresponding to a flight direction control instruction from a polar coordinate with the control device 102 as the origin to a flight coordinate with the aircraft 104 as the origin, a user through the control device 102 can control the aircraft 104 from the user's perspective, not from a perspective of an aircraft 104, thereby reducing the difficulty in controlling the aircraft 104.

Figure 4:
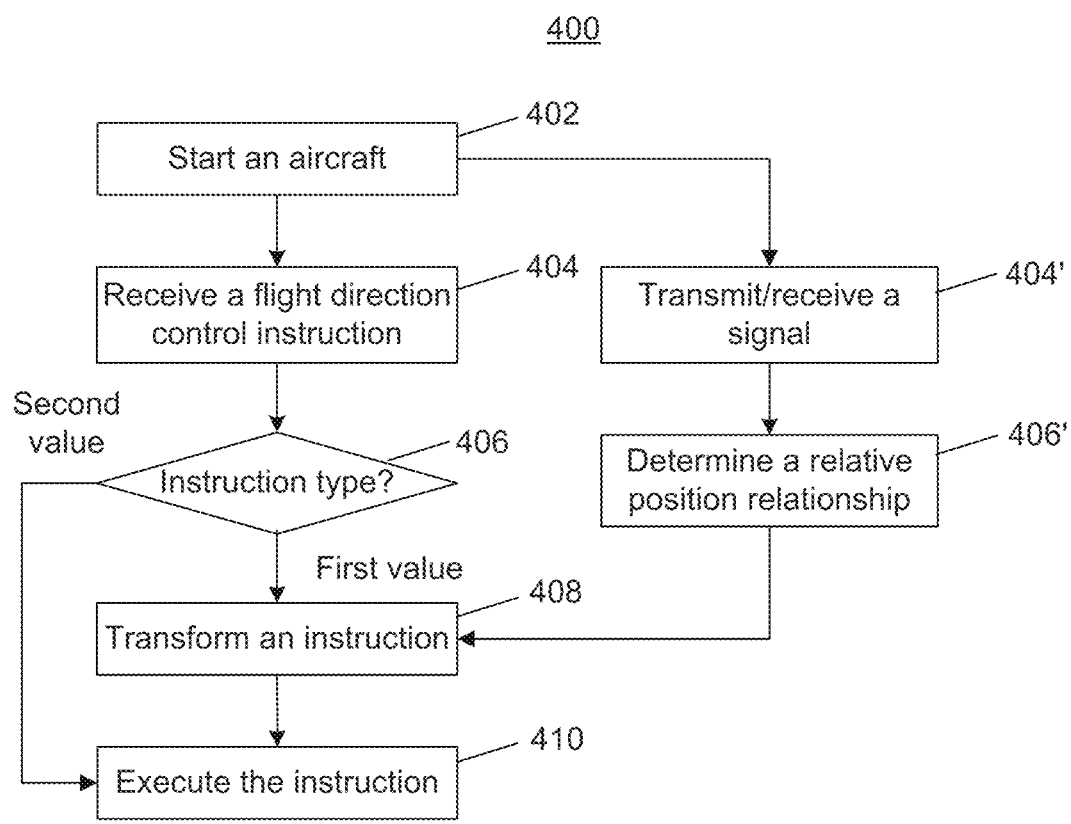
FIG. 4 is another flow chart showing a flight control method according to an exemplary embodiment.

FIG. 4 is a flow chart showing another flight control method 400 according to an exemplary embodiment of the present disclosure. As shown in FIG. 4, the method 400 may include the steps as follows.

In Step 402, an aircraft is started to fly.

In Step 404, the aircraft receives a flight direction control instruction sent by a control device.

In the present embodiment, a user may use a remote control device to transmit signals to and receive signals from the aircraft. For instance, the remote control device may be a dedicated aircraft remote controller or a smart device installed with an APP. A smart device may be a smart phone or a smart tablet computer. Wireless signals may be transmitted and received between the remote control device and the aircraft by means of WiFi, Bluetooth, and the like.

In Step 406, an instruction type of a received flight direction control instruction is identified by reading a value of a type identifier in the flight direction control instruction. When the type identifier has a first value, a target direction is obtained on the basis of a polar coordinate system, and the method 400 proceeds to Step 408. When the type identifier has a second value, the target direction is obtained on the basis of a flight coordinate system of the aircraft, and the method 400 proceeds to Step 410.

In the present embodiment, the location of the control device serves as an origin of the polar coordinate system, and the location of the aircraft serves as an origin of the flight coordinate system. When the control device sends a flight direction control instruction on the basis of the polar coordinate system, a corresponding target direction is obtained on the basis of the polar coordinate system, thereby facilitating the implementation of effective flight control by the user when it is difficult to distinguish flight attitudes of the aircraft, particularly, a four-axis aircraft. The aircraft is configured to transform the received target direction to one in its flight coordinate system so that the aircraft may complete the flight control. In some embodiments, when the control device sends a flight direction control instruction on the basis of the flight coordinate system, a corresponding target direction is obtained on the basis of the flight coordinate system. That is, the user sends, via the control device, the flight direction control instruction from a perspective of the aircraft, and the aircraft may directly execute the corresponding flight direction control instruction so as to smoothly fulfill the flight task.

In some embodiments, a switch for changing the instruction format may be provided on the remote control device so that the user may send a required type of flight direction control instruction by using the switch.

In some embodiments, a format of a control instruction may be set in advance. One or more data bits in the control instruction may be used as an instruction type identifier, thereby to present a control mode for the user. In some embodiments, a type identifier may include two data bits. For example, a first value of a type identifier can be 00, which indicates the target direction in the flight direction control instruction is obtained on the basis of the polar coordinate system, and a second value of a type identifier can be 01, which indicates the target direction in the flight direction control instruction is obtained on the basis of the flight coordinate system.

In Step 404', signal transmission and reception operations are executed between the aircraft and the control device.

In Step 406', the aircraft determines the positional relationship between the aircraft and the control device according to signal transmission and reception conditions.

In the present embodiment, the positional relationship between the aircraft and the control device is determined in Steps 404'-406'. Steps 404'-406' may be performed before and after Steps 404-406. The aircraft may execute Steps 404'-406' in accordance with a predetermined mode. For instance, the aircraft may execute Steps 404'-406' in accordance with a preset time period or after receiving the flight direction control instruction.

In some embodiments, the positional relationship between the aircraft and the control device may be determined on the basis of signal transmission and reception between the aircraft and the control device, e.g., a remote control device. Examples for determining the positional relationship on the basis of the signal transmission and reception conditions are illustrated below.

Example 1

As an exemplary implementation, an aircraft may be provided with a plurality of signal sensing devices. The signal sensing devices are installed at different positions on the aircraft, and are configured to sense a signal transmitted from a signal transceiver device of a control device. Signal strengths sensed by the signal sensing devices are compared to each other. In one embodiment, a signal sensing device that receives the strongest signal strength, a signal sensing device that receives the lowest signal strength, and the control device may form a straight line, with the signal sensing device that receives the strongest signal strength located adjacent to the control device on the straight line. A positional relationship of the aircraft and the control device is determined according to installation positions of the signal sensing devices on the aircraft.

Figure 5:
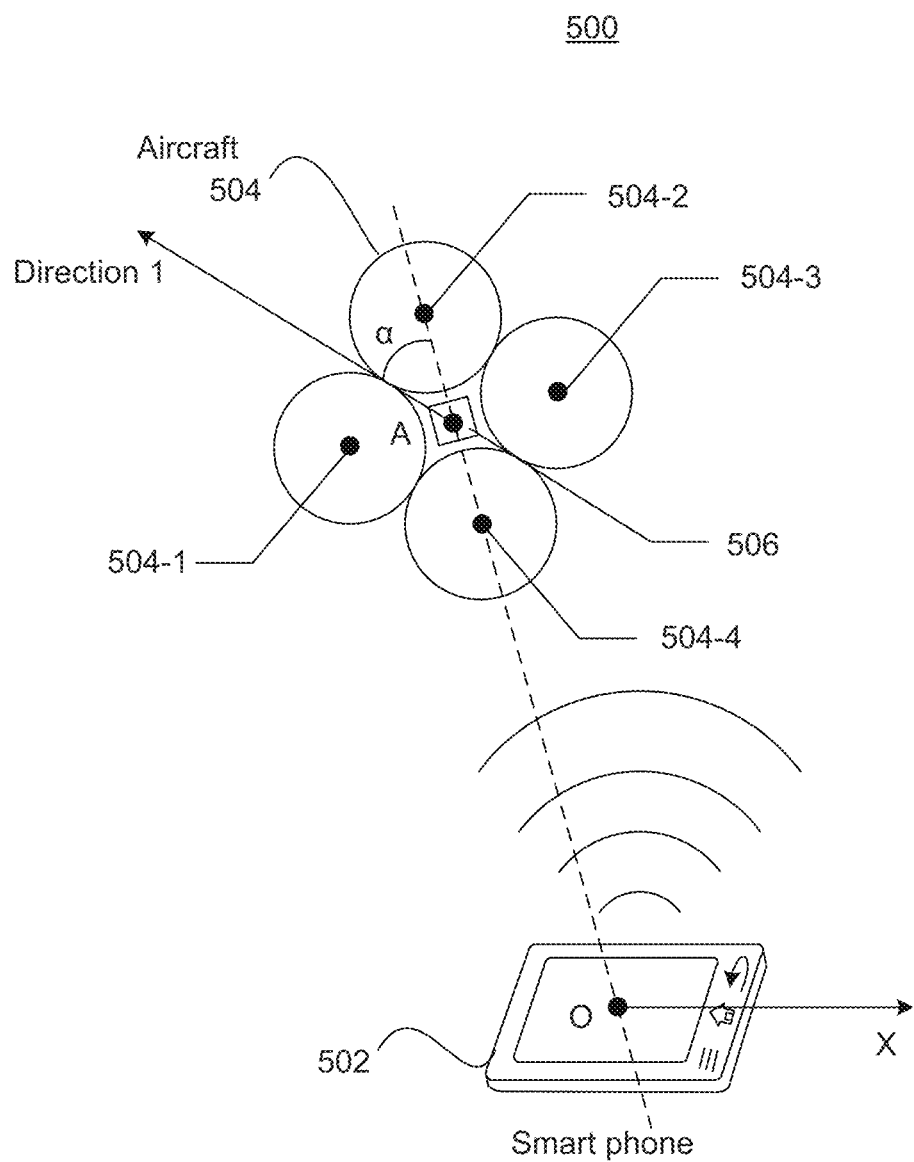
FIG. 5 is a schematic diagram illustrating a flight control system for determining a positional relationship according to an exemplary embodiment.

FIG. 5 is a schematic diagram illustrating a flight control system 500 for determining a positional relationship according to an exemplary embodiment. As shown in FIG. 5, a control device may be a smart phone 502. A user may hold the smart phone 502 as a remote control device so as to remotely control an aircraft 504. The smart phone 502 is provided with a signal transceiver device for transmitting or receiving wireless signals. The signal transceiver device is configured to transmit a sensing signal to the aircraft 504 for the aircraft 504 to determine the positional relationship between them. A plurality of signal sensing devices are provided at different positions on the aircraft 504. For instance, in a four-axis aircraft shown in FIG. 5, a first signal sensing device 504-1, a second signal sensing device 504-2, a third signal sensing device 504-3, and a fourth signal sensing device 504-4 are provided respectively in the axes of the aircraft 504. Each signal sensing device senses the sensing signal transmitted from the smart phone 502, and informs a processor 506 on the aircraft 504 of sensed signal strength. The processor 506 compares the signal strengths to determine a signal sensing device corresponding to the strongest signal strength and a signal sensing device corresponding to the lowest signal strength.

For example, the signal strength sensed by the fourth signal sensing device 504-4 is the strongest and the signal strength sensed by the second signal sensing device 504-2 is lowest. It can be determined that the control device 502 (namely the remote control device such as the smart phone in FIG. 5), the fourth signal sensing device 504-4, and the second signal sensing device 504-2 are located on the same straight line. In determining the positional relationship, the aircraft 504 may assume that the orientation of the control device 502 is in one direction. A polar coordinate system, such as the polar coordinate system OX shown in FIG. 5, may be determined accordingly.

As shown in FIG. 5, it is determined that the control device 502 is located at the origin of the polar coordinate system OX and that the aircraft 504 is located at a point A $(\rho, \theta)$ in the polar coordinate system OX. $\rho$ is the length of OA, and may be calculated according to sensed signal strengths by the fourth signal sensing device 504-4 and the second signal sensing device 504-2. For instance, correspondences between the sensed signal strengths and the distances can be determined in advance and stored in the aircraft 504. In some embodiments, a distance may be calculated. For instance, the location of the aircraft 504 at point A at a certain moment maybe recorded as an initial location, so a subsequent location of the aircraft 504 may be used to calculate a distance variation with respect to the point A. $\theta$ is an angle between OA and OX, and may be obtained by calculation after the orientation of a polar axis, namely, the X axis, of the polar coordinate system OX is determined.

Furthermore, because the installation position of each signal sensing device on the aircraft 504 is determined in advance, a current attitude of the aircraft and a deviation angle $\alpha$ between a direction 1 in which the aircraft 504 is moving and the OA line may be obtained on the basis of a coordinate position of the point A in the polar coordinate system OX. The aircraft 504 may use the deviation angle α to in its flight control, so that it is unnecessary for the control device 502 to get a real-time attitude of the aircraft 504.

Example 2

As another exemplary implementation, an aircraft may be provided with a plurality of signal transmitting devices installed at different positions on the aircraft. The signal transmitting devices are configured to simultaneously send detection signals to a signal transceiver device at a control device. After receiving the detection signals, the signal transceiver device returns a response message to the aircraft. The aircraft determines a detection signal first received and a detection signal last received and their corresponding signal transmitting devices based on the received response message. The signal transmitting device corresponding to the detection signal first received by the signal transceiver device, the signal transmitting device corresponding to the detection signal last received by the signal transceiver device, and the control device form a straight line with the signal transmitting device corresponding to the first received detection signal adjacent to the control device. A positional relationship can be determined according to installation positions of the signal transmitting devices on the aircraft.

Figure 6:
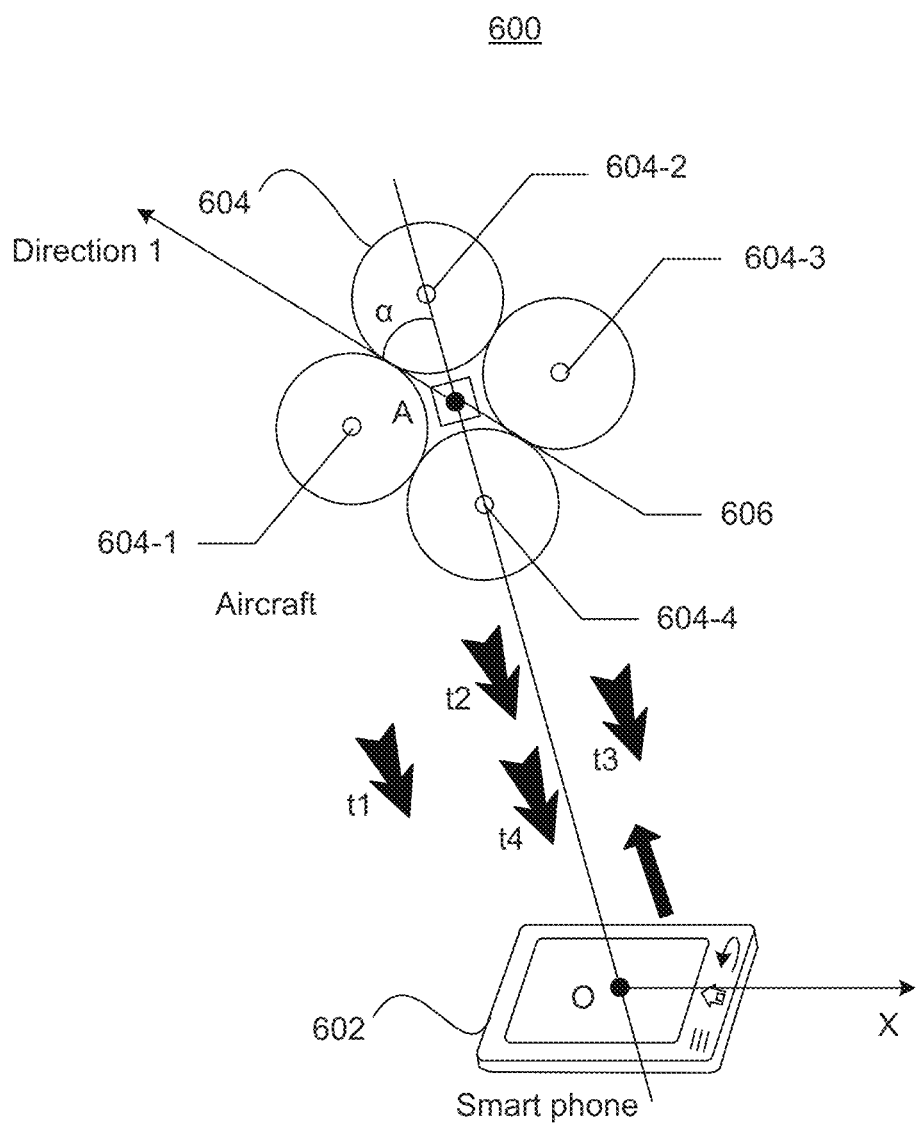
FIG. 6 is another schematic diagram illustrating a flight control system for determining a positional relationship according to an exemplary embodiment.

FIG. 6 is a schematic diagram illustrating a flight control system 600 for determining a positional relationship according to an exemplary embodiment. As shown in FIG. 6, a control device may be a smart phone 602. A user may hold the smart phone 602 as a remote control device so as to remotely control an aircraft 604. The smart phone 602 is provided with a signal transceiver device for transmitting or receiving wireless signals. The signal transceiver device is configured to receive detection signals and transmit response message to the aircraft 604 for the aircraft 604 to determine the positional relationship between them. As shown in FIG. 6, the aircraft 604 includes a first signal transmitting device 604-1, a second signal transmitting device 604-2, a third signal transmitting device 604-3, and a fourth signal transmitting device 604-4 provided at different positions on the aircraft 604. The signal transceiver device of the smart phone 602 may receive a detection signal sent by each signal transmitting device 604-1, 604-1, 604-3, or 604-4 on the aircraft 604.

Because installation positions of the signal transmitting devices 604-1, 604-1, 604-3, and 604-4 are different, distances between respective signal transmitting devices and the smart phone 602 may be different. When all of the signal transmitting devices 604-1, 604-1, 604-3, or 604-4 transmit detection signals simultaneously, the signal transceiver device in the smart phone 602 will receive these detection signals at different moments. An identifier of each signal detection device may be contained in the corresponding transmitted detection signal, so the smart phone 602 may distinguish and record a receiving sequence of the corresponding detection signal of each signal transmitting device.

For instance, as shown in FIG. 6, the detection signals sent by the first signal transmitting device 604-1, the second signal transmitting device 604-2, the third signal transmitting device 604-3, and the fourth signal transmitting device 604-4 are received by the signal transceiver device at time t1, t2, t3, and t4, respectively, in which t4 is the minimum and t2 is the maximum among them. In the illustrated embodiment, the control device, e.g., the smart phone 602 in FIG. 6, the fourth signal transmitting device 604-4 and the second signal transmitting device 604-2 are located on the same straight line. A positional relationship can be determined similar to the embodiment discussed with reference to FIG. 5, which will not be elaborated herein.

Example 3

As another exemplary implementation, positioning devices, such as Global Positioning System (GPS) chips and Beidou positioning chips, may be installed on an aircraft and a control device, e.g., a remote control device, respectively, so as to be configured to obtain positioning information, such as longitude and latitude information, about the aircraft and the remote control device, respectively. A positional relationship therebetween may be calculated by sharing the positioning information between the aircraft and the remote control device.

Referring again to FIG. 4, in Step 408, the aircraft transforms a target direction in the flight direction control instruction according to the positional relationship between the aircraft and the control device.

In Step 410, the instruction is executed to drive the aircraft to fly towards the target direction.

In the present embodiment, when it is determined that the flight direction control instruction includes the second value at step 406, the method 400 proceeds to step 410, in which the aircraft executes the received flight direction control instruction. When it is determined that the flight direction control instruction includes the first value at step 406, the method 400 proceeds to step 408, in which the aircraft transforms the target direction in the received flight direction control instruction from the polar coordinate system to the flight coordinate system and performs drive control in accordance with the transformed target direction in step 410.

When the flight direction control instruction is generated on the basis of a polar coordinate system, the aircraft may be controlled by flight control modes corresponding to different target directions.

1. Forward and Backward Flight

When the flight direction control instruction indicates forward flight or backward flight, the aircraft is driven to fly along a line of connecting the aircraft and a control device so that a length value in polar coordinate information varies but an angle value does not vary.

Figure 7:
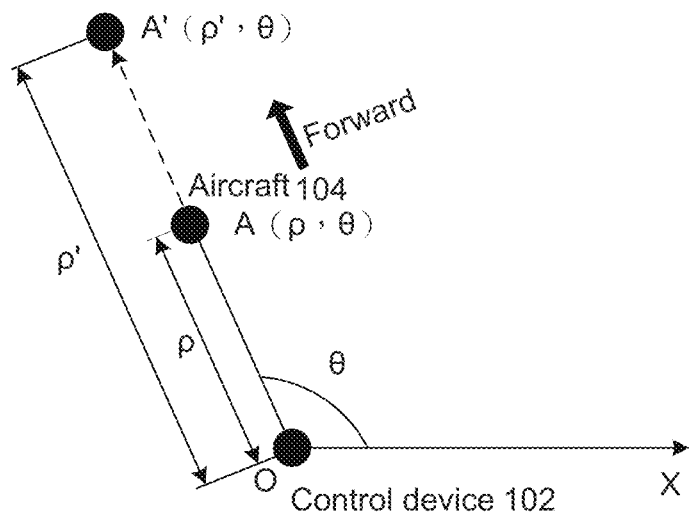
FIG. 7 is a schematic diagram illustrating a flight control method according to an exemplary embodiment.

FIG. 7 is a schematic diagram illustrating flight control mode according to an exemplary embodiment. As shown in FIG. 7, the control device 102 is located at a point O, and a polar coordinate system OX with the point O as an origin is established. The aircraft 104 is located at a point A (ρ, θ), where ρ is the length of a segment OA, and θ is an angle between OX and OA.

When the flight direction control instruction sent by the control device 102 is to fly forward, the aircraft 104 can fly along an extension direction of a line OA by means of power adjustment and allocation for each drive component, such as drive motors on four axes of a four-axis aircraft. After the aircraft 104 flies to a point A', its coordinate information is changed to (ρ', θ).

In the illustrated embodiment, the control device 102 does not need to focus on real-time attitude of the aircraft 104 at the point A. For instance, the orientation of the aircraft 104 may not be in the OA line direction, but the aircraft 104 can self-adjust its real-time attitude and flight direction on the basis of the positional relationship between the aircraft 104 itself and the control device 102, and the coordinate information of the point A, thereby smoothly flying to point A'. Similarly, when the flight direction control instruction is to fly backward, the aircraft 104 can fly so that ρ decreases and θ remains unchanged. That is, the aircraft 104 can fly along a direction of a ray AO.

2. Leftward and Rightward Flight

When the flight direction control instruction is to turn left or right, the aircraft is driven to fly along a direction perpendicular to a line connecting between the aircraft and a control device so that an angle value in the polar coordinate information varies and a length value does not vary.

Figure 8:
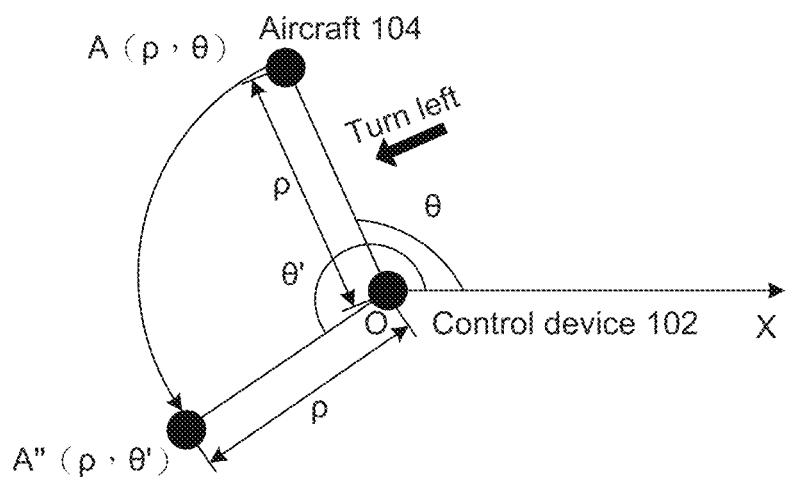
FIG. 8 is another schematic diagram illustrating a flight control method according to an exemplary embodiment.

As shown in FIG. 8, the control device 102 is located at a point O, and a polar coordinate system OX with the point O as an origin is established. The aircraft 104 is located at a point A (ρ, θ), where ρ is the length of a segment OA, and θ is an angle between OX and OA.

When the flight direction control instruction sent by the control device 102 is to turn left, the aircraft 104 can fly along a direction perpendicular to a line connecting between the aircraft 104 itself and the point O by means of power adjustment and allocation for each drive component, such as drive motors on four axes of a four-axis aircraft. In other words, the aircraft 104 flies along a circular arc with the point O as the center of a circle and OA line as a radius. The orientation of the aircraft 104 in the flight process is maintained tangent to the circular arc. For instance, the aircraft 104 flies from the point A to a point A", and the coordinate information is changed to (ρ, θ').

In the illustrated embodiment, the aircraft 104 is flying around the control device 102 as a center, thereby simplifying the flight control by the control device. Similarly, when the flight direction control instruction is to turn right, the aircraft 104 can fly while ρ remains unchanged and θ decreases. That is, the aircraft 104 shall fly along a right tangential direction of the OA.

3. Oblique Flight

When the flight direction control instruction is to fly in an oblique direction, a straight component and a rotational component contained in the flight direction control instruction are extracted. The straight component corresponds to forward flight or backward flight of the aircraft 104, and the rotational component corresponds to left turn or right turn of the flight. The aircraft 104 is driven according to the straight component and the rotational component so that a length value in coordinate information varies in accordance with the straight component and an angle value varies in accordance with the rotational component.

Figure 9:
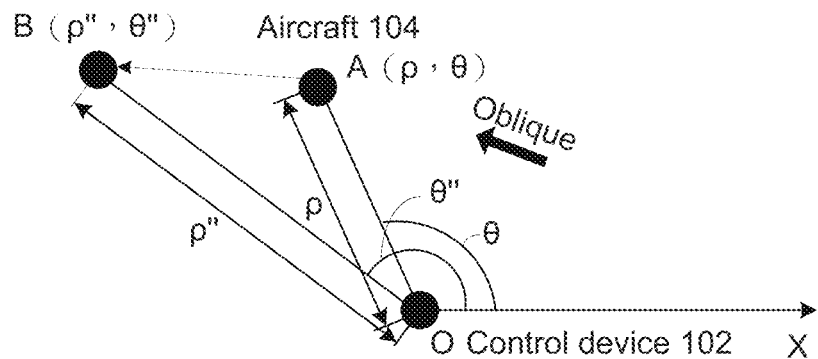
FIG. 9 is another schematic diagram illustrating a flight control method according to an exemplary embodiment.

As shown in FIG. 9, the control device 102 is located at a point O, and a polar coordinate system OX with the point O as an origin is established. The aircraft 104 is located at a point A (ρ, θ), where ρ is the length of a segment OA, and θ is an angle between OX and OA.

An oblique direction refers to a direction, which is not a forward-backward direction or a leftward-rightward direction, but contains components of both the forward-backward direction and the leftward-rightward direction. When the flight direction control instruction sent by the control device 102 instructs the aircraft 104 to perform an oblique flight, the aircraft 104 can be controlled to fly by decomposing the oblique direction into a forward-backward direction (namely the straight component) and a leftward-rightward direction (namely the rotational component). For instance, the aircraft 104 is located at a point A (ρ, θ). On the basis of a target direction of the flight direction control instruction, the straight component obtained by decomposition is used to adjust ρ, the rotational component obtained by decomposition is used to adjust θ to become ρ" and θ", respectively. That is, a point B (ρ", θ") becomes a flight target destination.

Consistent with embodiments of the flight control methods explained above, the present disclosure also provides a flight control apparatus.

Figure 10:
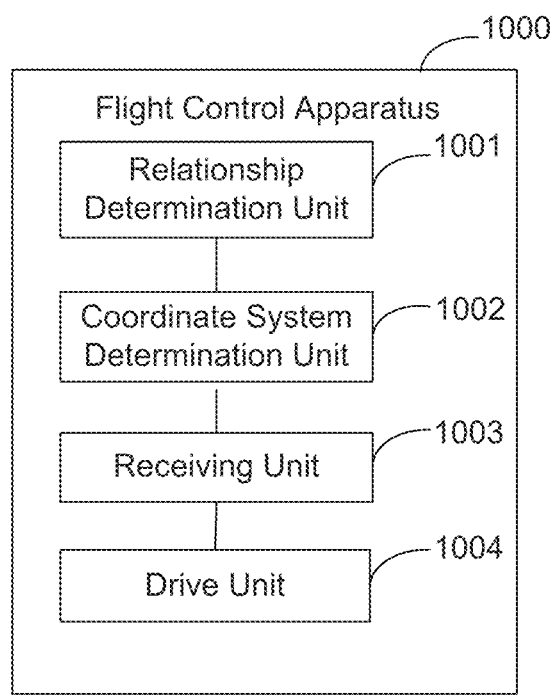
FIG. 10 is a block diagram of a flight control apparatus according to an exemplary embodiment.

FIG. 10 is a block diagram of a flight control apparatus 1000 of an aircraft according to an exemplary embodiment. Referring to FIG. 10, the apparatus 1000 includes a relationship determination unit 1001, a coordinate system determination unit 1002, a receiving unit 1003 and a drive unit 1004.

The relationship determination unit 1001 is configured to determine a positional relationship between an aircraft and a control device.

The coordinate system determination unit 1002 is configured to determine a polar coordinate system with the control device as an origin according to the positional relationship.

The receiving unit 1003 is configured to receive a flight direction control instruction sent by the control device. The flight direction control instruction is generated on the basis of the polar coordinate system.

The drive unit 1004 is configured to drive, according to coordinate information about the aircraft in the polar coordinate system, the aircraft to fly in accordance with the flight direction control instruction.

Figure 11:
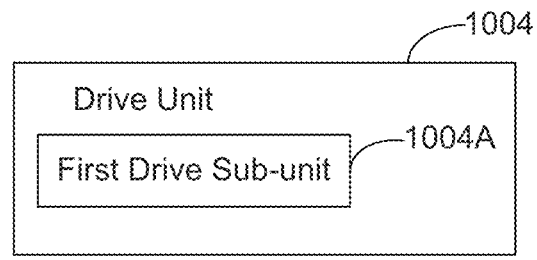
FIG. 11 is a block diagram of a drive unit according to an exemplary embodiment.

FIG. 11 is block diagram of the drive unit 1004 according to an exemplary embodiment of the present disclosure. Referring to FIG. 11, the drive unit 1004 may include a first drive sub-unit 1004A configured to, when the flight direction control instruction instructs the aircraft to perform forward or backward flight, drive the aircraft to fly along a direction of a line connecting the aircraft and the control device so that a length value in the coordinate information varies while an angle value does not vary.

Figure 12:
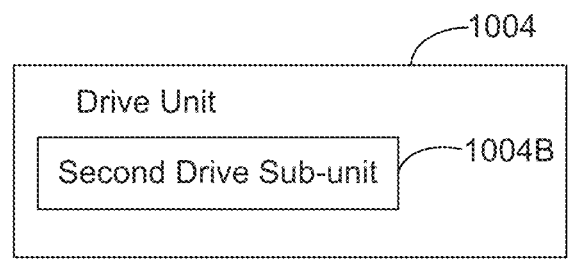
FIG. 12 is block diagram of a drive unit according to an exemplary embodiment.

FIG. 12 is block diagram of the drive unit 1004 according to an exemplary embodiment of the present disclosure. Referring to FIG. 12, the drive unit 1004 may include a second drive sub-unit 1004B.

The second drive sub-unit 1004B is configured to, when the flight direction control instruction instructs the aircraft to make a left turn or right turn, drive the aircraft to fly along a direction perpendicular to a line connecting the aircraft and the control device so that an angle value in the coordinate information varies while a length value does not vary.

Figure 13:
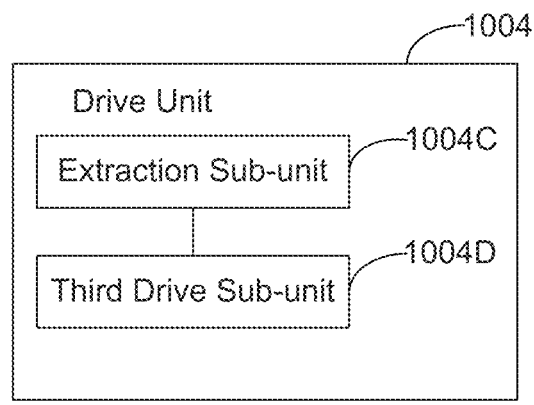
FIG. 13 is block diagram of a drive unit according to an exemplary embodiment.

FIG. 13 is block diagram of the drive unit 1004 according to an exemplary embodiment of the present disclosure. Referring to FIG. 13, the drive unit 1004 may include an extraction sub-unit 1004C and a third drive sub-unit 1004D.

The extraction sub-unit 1004C is configured to, when the flight direction control instruction instructs the aircraft to perform an oblique flight, extract a straight component and a rotational component contained in the flight direction control instruction. The straight component corresponds to forward or backward flight of the aircraft, and the rotational component corresponds to left turn or right turn of the flight.

The third drive sub-unit 1004D is configured to drive the aircraft according to the straight component and the rotational component so that a length value in the coordinate information varies in accordance with the straight component and an angle value varies in accordance with the rotational component.

Figure 14:
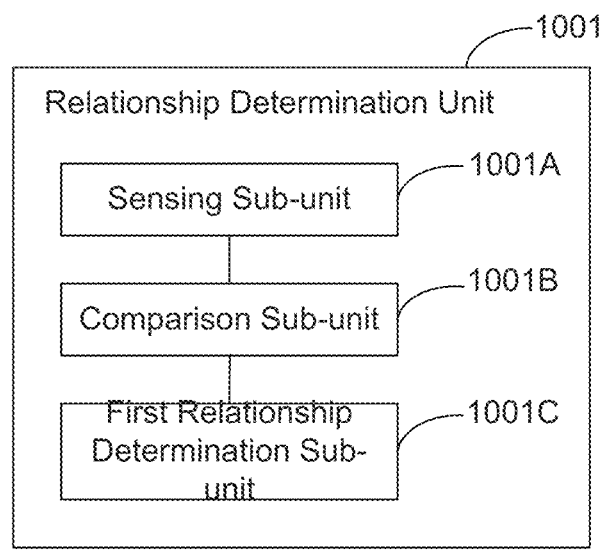
FIG. 14 is block diagram of a relationship determination unit according to an exemplary embodiment.

FIG. 14 is block diagram of the relationship determination unit 1001 according to an exemplary embodiment of the present disclosure. Referring to FIG. 14, the relationship determination unit 1001 may include a sensing sub-unit 1001A, a comparison sub-unit 1001B, and a first relationship determination sub-unit 1001C.

The sensing sub-unit 1001A is configured to sense a sensing signal transmitted by a signal transceiver device at the control device via a plurality of signal sensing devices installed at different positions on the aircraft.

The comparison sub-unit 1001B is configured to compare signal strengths of the sensing signals, to identify a first signal sensing device corresponding to strongest signal strength and a second signal sensing device corresponding to lowest signal strength. The first signal sensing device, the second signal sensing device, and the control device forms a straight line with the first signal sensing device located adjacent to the control device.

The first relationship determination sub-unit 1001C is configured to determine the positional relationship according to installation positions of the signal sensing devices on the aircraft.

In some embodiments, the sensing sub-unit 1001A, the comparison sub-unit 1001B, and the first relationship determination sub-unit 1001C shown in FIG. 14 may be combined with any of the apparatus embodiments shown in FIGS. 11-13.

Figure 15:
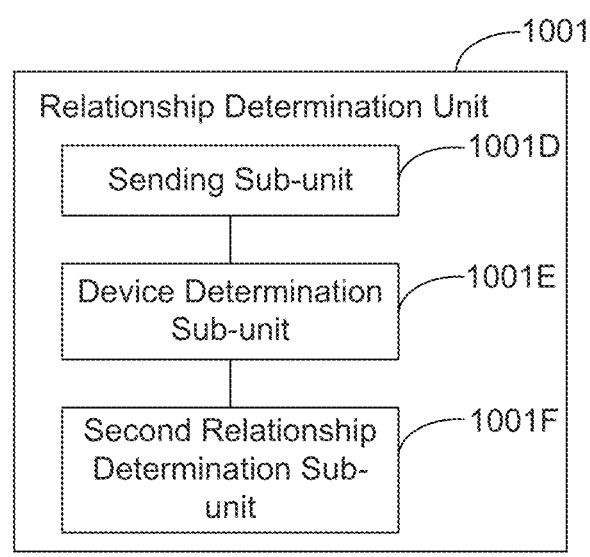
FIG. 15 is block diagram of another relationship determination unit according to an exemplary embodiment.

FIG. 15 is block diagram of the relationship determination unit 1001 according to an exemplary embodiment of the present disclosure. Referring to FIG. 15, the relationship determination unit 1001 may include a sensing sub-unit 1001D, a device determination sub-unit 1001E, and a second relationship determination sub-unit 1001F.

The sending sub-unit 1001D is configured to simultaneously send detection signals to a signal transceiver device at the control device via a plurality of signal transmitting devices installed at different positions on the aircraft.

The device determination sub-unit 1001E is configured to determine a detection signal first received by the signal transceiver device and a detection signal last received by the signal transceiver device according to a response message returned from the signal transceiver device. The signal transmitting devices corresponding to the determined detection signals and the control device are located on the same straight line. The signal transmitting device corresponding to the first received detection signal and the control device are adjacent to each other on the straight line.

The second relationship determination sub-unit 1001F is configured to determine the positional relationship according to installation positions of the signal transmitting devices on the aircraft.

In some embodiments, the sensing sub-unit 1001D, the device determination sub-unit 1001E, and the second relationship determination sub-unit 1001F shown in FIG. 15 may also be combined with any of the apparatus embodiments shown in FIGS. 11-13.

Figure 16:
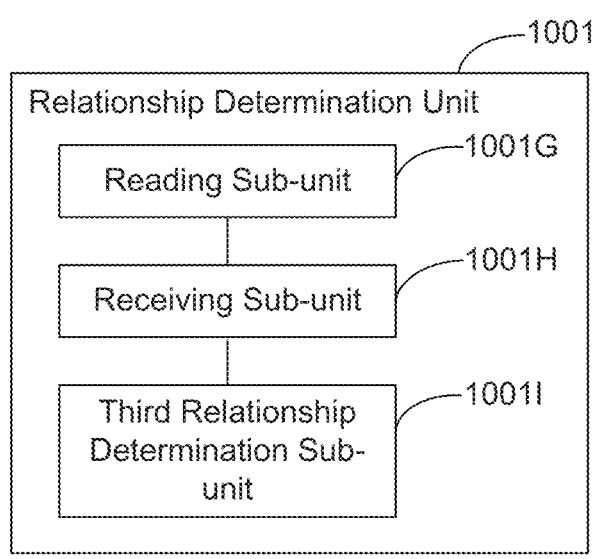
FIG. 16 is block diagram of another relationship determination unit according to an exemplary embodiment.

FIG. 16 is a block diagram of the relationship determination unit 1001 according to an exemplary embodiment of the present disclosure. Referring to FIG. 16, the relationship determination unit 1001 may include a reading sub-unit 1001G, a receiving sub-unit 1001H, and a third relationship determination sub-unit 1001I.

The reading sub-unit 1001G is configured to read first positioning information of the aircraft via a first positioning device installed on the aircraft.

The receiving sub-unit 1001H is configured to receive second positioning information sent by a signal transceiver device at the control device. The second positioning information is generated by a second positioning device at the control device.

The third relationship determination sub-unit 1001I is configured to determine the positional relationship according to the first positioning information and the second positioning information.

In some embodiments, the reading sub-unit 1001G, the receiving sub-unit 1001H, and the third relationship determination sub-unit 1001I shown in FIG. 16 may also be combined with any of the apparatus embodiments shown in FIGS. 11-13.

Figure 17:
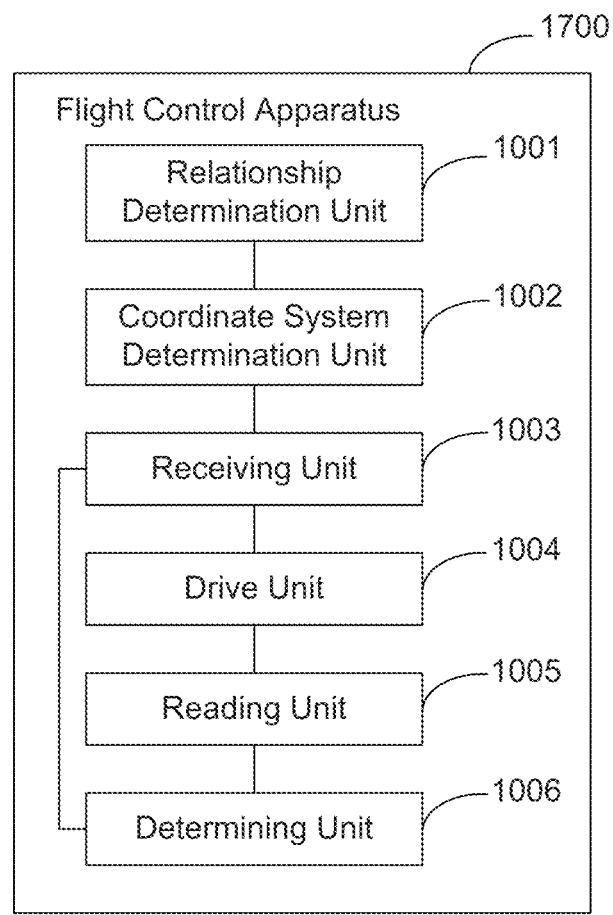
FIG. 17 is another block diagram of a flight control apparatus according to an exemplary embodiment.

FIG. 17 is another block diagram of a flight control apparatus 1700 according to an exemplary embodiment. The apparatus 1700 includes a relationship determination unit 1001, a coordinate system determination unit 1002, a receiving unit 1003, a drive unit 1004, a reading unit 1005, and a determination unit 1006. The relationship determination unit 1001, the coordinate system determination unit 1002, the receiving unit 1003, and the drive unit 1004 are similar to those explained in FIGS. 10-16 and will not be elaborated herein.

The reading unit 1005 is configured to read a type identifier contained in the flight direction control instruction.

The determination unit 1006 is configured to determine the type of the flight direction control instruction according to the type identifier. When the type identifier has a first value, it is determined that the flight direction control instruction is generated on the basis of the polar coordinate system; and when the type identifier has a second value, it is determined that the flight direction control instruction is generated on the basis of a flight coordinate system of the aircraft, so that the drive unit 1004 executes the flight direction control instruction so as to drive the aircraft.

In some embodiments, the reading unit 1005 and the determination unit 1006 shown in FIG. 17 may also be combined with any one of the apparatus embodiments shown in FIGS. 11-16. The present disclosure is not limited to a particular combination.

Figure 18:
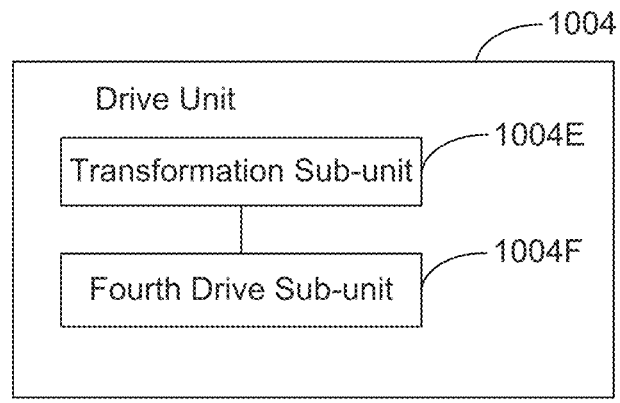
FIG. 18 is block diagram of a drive unit according to an exemplary embodiment.

FIG. 18 is block diagram of the drive unit 1004 according to an exemplary embodiment. The drive unit 1004 include: a transformation sub-unit 1004E and a fourth drive sub-unit 1004F.

The transformation sub-unit 1004E is configured to transform a target direction corresponding to the flight direction control instruction from the polar coordinate system to a flight coordinate system of the aircraft.

The fourth drive sub-unit 1004F is configured to drive the aircraft in accordance with the transformed target direction.

In some embodiments, the transformation sub-unit 1004E and the fourth drive sub-unit 1004F shown in FIG. 18 may also be combined with any one of the above apparatus embodiments shown in FIGS. 11-17. The present disclosure is not limited to a particular combination.

With respect to the apparatuses explained in the above embodiments, the specific manners for performing operations for individual units or sub-units therein have been described in detail in the methods embodiments, which will not be elaborated herein.

Because the apparatus embodiments substantially correspond to the method embodiments, the descriptions of them may be referred to each other. The apparatus embodiments described above are merely schematic. The units illustrated as separate components may be or may not be physically separated. Components for the units may be or may not be physical units. That is, the components may be located at a place or may be distributed on a plurality of network units. The technical solutions in the embodiments of the present disclosure may be fulfilled by selecting some or all units or subunits according to actual requirements. Those skilled in the art may understand and implement the solutions without creative work.

In some embodiments, the embodiments of the present disclosure also provide a flight control apparatus, which includes: a processor; and a memory configured to store instructions executable by the processor. The processor is configured to: determine a positional relationship between an aircraft and a control device; determine a polar coordinate system with the control device as an origin according to the positional relationship; and receive a flight direction control instruction sent by the control device, the flight direction control instruction being generated on the basis of the polar coordinate system; and drive, according to coordinate information of the aircraft in the polar coordinate system, the aircraft to fly in accordance with the flight direction control instruction.

In some embodiments, the embodiments of the present disclosure also provide a terminal, which includes a memory and one or more programs. The one or more programs are stored in the memory and executed by one or more processors. The one or more programs include instructions configured to perform the following operations: determining a positional relationship between an aircraft and a control device; determining a polar coordinate system with the control device as an origin according to the positional relationship; receiving a flight direction control instruction sent by the control device, the flight direction control instruction being generated on the basis of the polar coordinate system; and driving, according to coordinate information about the aircraft in the polar coordinate system, the aircraft to fly in accordance with the flight direction control instruction.

Figure 19:
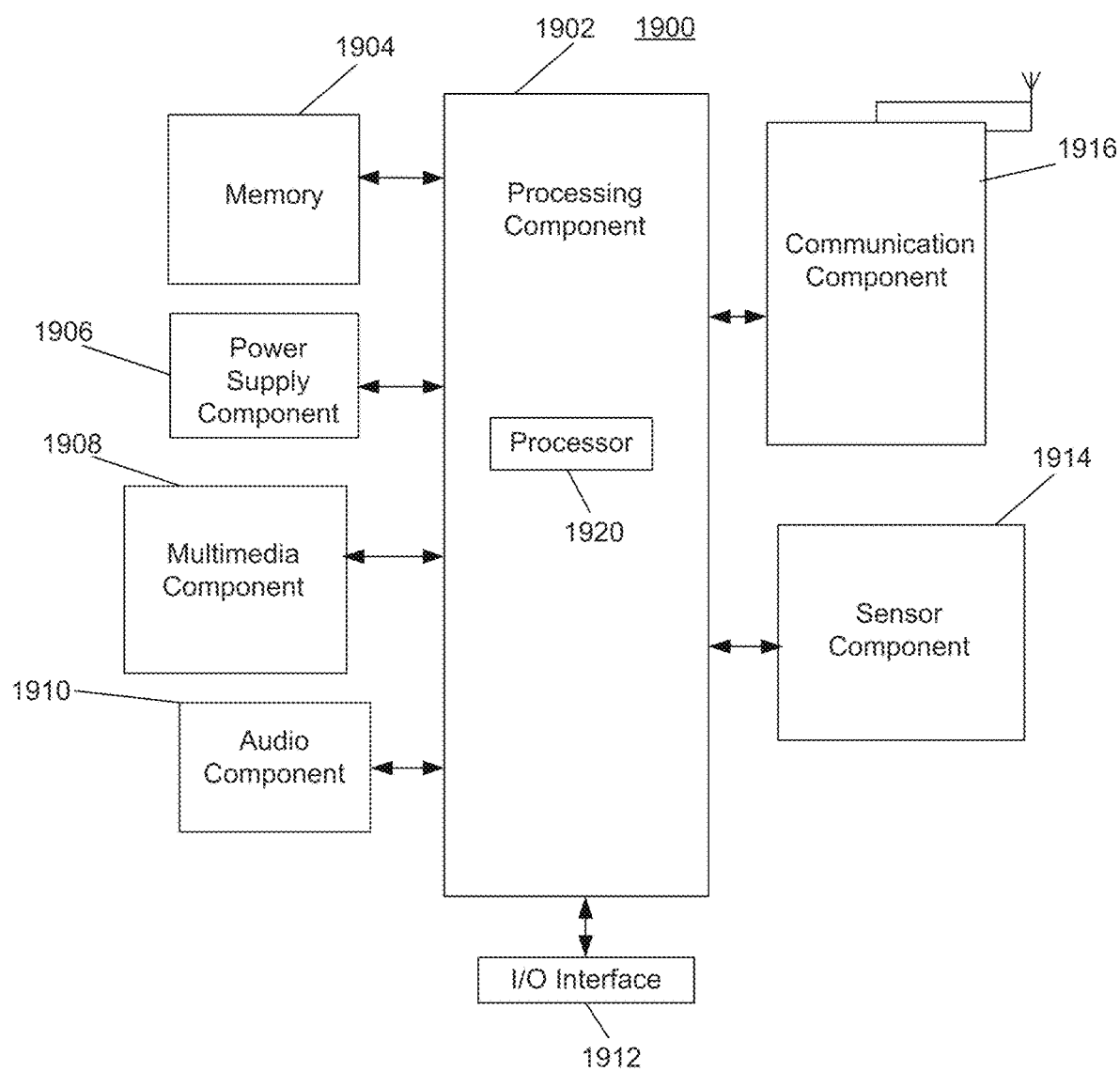
FIG. 19 is a schematic diagram illustrating an apparatus for flight control according to an exemplary embodiment.

FIG. 19 is a block diagram of an apparatus 1900 for flight control according to an exemplary embodiment. For instance, the apparatus 1900 may be a mobile phone, a computer, a digital broadcast terminal, a messaging device, a game console, a tablet device, a medical device, exercise equipment, a personal digital assistant and the like.

Referring to FIG. 19, the apparatus 1900 may include one or more of the following components: a processing component 1902, a memory 1904, a power supply component 1906, a multimedia component 1908, an audio component 1910, an input/output (I/O) interface 1912, a sensor component 1914 and a communication component 1916.

The processing component 1902 typically controls overall operations of the apparatus 1900, such as the operations associated with display, telephone calls, data communications, camera operations, and recording operations. The processing component 1902 may include one or more processors 1920 to execute instructions to perform all or part of the steps in the above described methods. Moreover, the processing component 1902 may include one or more modules which facilitate the interaction between the processing component 1902 and other components. For instance, the processing component 1902 may include a multimedia module to facilitate the interaction between the multimedia component 1908 and the processing component 1902.

The memory 1904 is configured to store various types of data to support the operation of the apparatus 1900. Examples of such data include instructions for any application or method operated on the apparatus 1900, contact data, phonebook data, messages, pictures, videos, etc. The memory 1904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1906 provides power to various components of the apparatus 1900. The power supply component 1906 may include a power management system, one or more power supplies, and any other components associated with the generation, management, and distribution of power in the apparatus 1900.

The multimedia component 1908 includes a screen providing an output interface between the apparatus 1900 and a user. In some embodiments, the screen may include a liquid crystal display (LCD) and a touch panel (TP). If the screen includes a TP, the screen may be implemented as a touch screen to receive input signals from the user. The TP includes one or more touch sensors to sense touches, swipes, and gestures on the TP. The touch sensors may not only sense a boundary of a touch or swipe action, but also sense a period of time and a pressure associated with the touch or swipe action. In some embodiments, the multimedia component 1908 includes a front camera and/or a rear camera. The front camera and the rear camera may receive external multimedia data while the apparatus 1900 is in an operation mode, such as a photographing mode or a video mode. Each of the front camera and the rear camera may be a fixed optical lens system or may have optical zoom capability.

The audio component 1910 is configured to output and/or input audio signals. For instance, the audio component 1910 includes a microphone configured to receive an external audio signal when the apparatus 1900 is in an operation mode, such as a call mode, a recording mode, and a voice recognition mode. The received audio signal may be further stored in the memory 1904 or transmitted via the communication component 1916. In some embodiments, the audio component 1910 further includes a speaker configured to output audio signals.

The I/O interface 1912 provides an interface between the processing component 1902 and peripheral interface modules, such as a keyboard, a click wheel, buttons, and the like. The buttons may include, but are not limited to, a home button, a volume button, a starting button, and a locking button.

The sensor component 1914 includes one or more sensors configured to provide status assessments of various aspects of the apparatus 1900. For instance, the sensor component 1914 may detect an open/closed status of the apparatus 1900, relative positioning of components, e.g., a display and a keypad, of the apparatus 1900, a change in position of the apparatus 1900 or a component of the apparatus 1900, a presence or absence of user contact with the apparatus 1900, an orientation or an acceleration/deceleration of the apparatus 1900, and a change in temperature of the apparatus 1900. The sensor component 1914 may include a proximity sensor configured to detect the presence of nearby objects without any physical contact. The sensor component 1914 may also include a light sensor, such as a CMOS or CCD image sensor, for use in imaging applications. In some embodiments, the sensor component 1914 may also include an accelerometer sensor, a gyroscope sensor, a magnetic sensor, a pressure sensor, or a temperature sensor.

The communication component 1916 is configured to facilitate communication, wired or wirelessly, between the apparatus 1900 and other devices. The apparatus 1900 can access a wireless network based on a communication standard, such as WiFi, 2G, 3G, 4G, or a combination thereof. In one exemplary embodiment, the communication component 1916 receives a broadcast signal or broadcast associated information from an external broadcast management system via a broadcast channel. In one exemplary embodiment, the communication component 1916 further includes a near field communication (NFC) module to facilitate short-range communications. For instance, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1904, executable by the processor 1920 in the apparatus 1900, for performing the above-described methods. For instance, the non-transitory computer-readable storage medium may be a ROM, a random access memory (RAM), a CD-ROM, a magnetic tape, a floppy disc, an optical data storage device, and the like.

Other implementation solutions of the embodiments of the present disclosure will be apparent to those skilled in the art from consideration of the specification and practice of the disclosure disclosed here. This application is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

INDUSTRIAL APPLICABILITY

By establishing a polar coordinate system with a user/control device as an origin and adopting a flight direction control instruction based on the polar coordinate system, the embodiments of the present disclosure enable the user to control an aircraft/drone without considering and controlling from a perspective of an aircraft, thereby simplifying the control operations and reducing the difficulty in controlling the aircraft.

What is claimed is:

1. A flight control method, comprising:
   determining a positional relationship between an aircraft and a control device;
   determining a polar coordinate system with the control device as an origin according to the positional relationship;
   receiving a flight direction control instruction sent by the control device, the flight direction control instruction being generated on the basis of the polar coordinate system; and
   driving, according to coordinate information about the aircraft in the polar coordinate system, the aircraft to fly in accordance with the flight direction control instruction,
   wherein the determining the positional relationship between the aircraft and the control device comprises:
      sensing a sensing signal transmitted by a signal transceiver device at the control device via a plurality of signal sensing devices installed at different positions on the aircraft;
      comparing signal strengths of the sensing signal to determine a first signal sensing device corresponding to a strongest signal strength and a second signal sensing device corresponding to a lowest signal strength, wherein the first signal sensing device, the second signal sensing device, and the control device form a straight line, and the first signal sensing device and the control device are adjacent to each other on the straight line; and
      determining the positional relationship according to installation positions of the first and second signal sensing devices on the aircraft; or
   wherein the determining the positional relationship between the aircraft and the control device comprises:
      simultaneously sending detection signals to a signal transceiver device at the control device via a plurality of signal transmitting devices installed at different positions on the aircraft;
      determining a detection signal first received by the signal transceiver device and a detection signal last received by the signal transceiver device according to a response message returned from the signal transceiver device, to determine a first signal transmitting device corresponding to the detection signal first received by the signal transceiver device and a second signal transmitting device corresponding to the detection signal last received by the signal transceiver device, wherein the first signal transmitting device, the second signal transmitting device, and the control device form a straight line, and the first signal transmitting device and the control device are adjacent to each other on the straight line; and
      determining the positional relationship according to installation positions of the first and second signal transmitting devices on the aircraft.

2. The method of claim 1, wherein the driving the aircraft to fly in accordance with the flight direction control instruction comprises:
   when the flight direction control instruction instructs the aircraft to perform forward flight or backward flight, driving the aircraft to fly along a direction of a line connecting the aircraft and the control device so that a length value in the coordinate information varies and an angle value in the coordinate information does not vary.

3. The method of claim 1, wherein the driving the aircraft to fly in accordance with the flight direction control instruction comprises:
   when the flight direction control instruction instructs the aircraft to make a left turn or a right turn, driving the aircraft to fly along a direction perpendicular to a line connecting the aircraft and the control device so that an angle value in the coordinate information varies and a length value in the coordinate information does not vary.

4. The method of claim 1, wherein the driving the aircraft to fly in accordance with the flight direction control instruction comprises:

when the flight direction control instruction instructs the aircraft to perform oblique flight, extracting a straight component and a rotational component contained in the flight direction control instruction, the straight component corresponding to forward flight or backward flight of the aircraft, and the rotational component corresponding to a left turn or a right turn of the flight; and driving the aircraft according to the straight component and the rotational component so that a length value in the coordinate information varies in accordance with the straight component and an angle value in the coordinate information varies in accordance with the rotational component.

5. The method of claim 1, wherein the determining the positional relationship between the aircraft and the control device comprises:

reading first positioning information about the aircraft via a first positioning device installed on the aircraft;

receiving second positioning information sent by a signal transceiver device at the control device, the second positioning information being generated by a second positioning device at the control device; and determining the positional relationship according to the first positioning information and the second positioning information.

6. The method of claim 1, further comprising:

reading a type identifier contained in the flight direction control instruction; and determining a type of the flight direction control instruction according to the type identifier, wherein when the type identifier has a first value, it is determined that the flight direction control instruction is generated on the basis of the polar coordinate system; and when the type identifier has a second value, it is determined that the flight direction control instruction is generated on the basis of a flight coordinate system of the aircraft, such that the flight direction control instruction is executed to drive the aircraft.

7. The method of claim 1, wherein the driving the aircraft to fly in accordance with the flight direction control instruction comprises:

transforming a target direction corresponding to the flight direction control instruction from the polar coordinate system to a flight coordinate system of the aircraft; and driving the aircraft in accordance with the transformed target direction.

8. An apparatus, comprising:

a processor; and a memory configured to store instructions executable by the processor, wherein the processor is configured to:

determine a positional relationship between an aircraft and a control device;

determine a polar coordinate system with the control device as an origin according to the positional relationship;

receive a flight direction control instruction sent by the control device, the flight direction control instruction being generated on the basis of the polar coordinate system; and drive, according to coordinate information about the aircraft in the polar coordinate system, the aircraft to fly in accordance with the flight direction control instruction, wherein in order to determine the positional relationship between the aircraft and the control device, the processor is configured to:

sense a sensing signal transmitted by a signal transceiver device at the control device via a plurality of signal sensing devices installed at different positions on the aircraft;

compare signal strengths of the sensing signal to determine a first signal sensing device corresponding to a strongest signal strength and a second signal sensing device corresponding to a lowest signal strength, wherein the first signal sensing device, the second signal sensing device, and the control device form a straight line, and the first signal sensing device and the control device are adjacent to each other on the straight line; and determine the positional relationship according to installation positions of the first and second signal sensing devices on the aircraft; or wherein in order to determine the positional relationship between the aircraft and the control device, the processor is configured to:

simultaneously send detection signals to a signal transceiver device at the control device via a plurality of signal transmitting devices installed at different positions on the aircraft;

determine a detection signal first received by the signal transceiver device and a detection signal last received by the signal transceiver device according to a response message returned from the signal transceiver device, to determine a first signal transmitting device corresponding to the detection signal first received by the signal transceiver device and a second signal transmitting device corresponding to the detection signal last received by the signal transceiver device, wherein the first signal transmitting device, the second signal transmitting device, and the control device form a straight line, and the first signal transmitting device and the control device are adjacent to each other on the straight line; and determine the positional relationship according to installation positions of the first and second signal transmitting devices on the aircraft.

9. The apparatus according to claim 8, wherein in order to drive the aircraft to fly in accordance with the flight direction control instruction, the processor is configured to:

when the flight direction control instruction instructs the aircraft to perform forward flight or backward flight, drive the aircraft to fly along a direction of a line connecting the aircraft and the control device so that a length value in the coordinate information varies and an angle value in the coordinate information does not vary.

10. The apparatus according to claim 8, in order to drive the aircraft to fly in accordance with the flight direction control instruction, the processor is configured to:

when the flight direction control instruction instructs the aircraft to make a left turn or a right turn, drive the aircraft to fly along a direction perpendicular to a line connecting the aircraft and the control device so that an angle value in the coordinate information varies and a length value in the coordinate information does not vary.

11. The apparatus according to claim 8, wherein in order to drive the aircraft to fly in accordance with the flight direction control instruction, the processor is configured to:

when the flight direction control instruction instructs the aircraft to perform oblique flight, extract a straight component and a rotational component contained in the flight direction control instruction, the straight component corresponding to forward flight or backward flight of the aircraft, and the rotational component corresponding to a left turn or a right turn of the flight; and
drive the aircraft according to the straight component and the rotational component so that a length value in the coordinate information varies in accordance with the straight component and an angle value in the coordinate information varies in accordance with the rotational component.

12. The apparatus according to claim 8, wherein in order to determine the positional relationship between the aircraft and the control device, the processor is configured to:
read first positioning information about the aircraft via a first positioning device installed on the aircraft;
receive second positioning information sent by a signal transceiver device at the control device, the second positioning information being generated by a second positioning device at the control device; and
determine the positional relationship according to the first positioning information and the second positioning information.

13. The apparatus according to claim 8, wherein the processor is further configured to:
read a type identifier contained in the flight direction control instruction; and
determine a type of the flight direction control instruction according to the type identifier, wherein when the type identifier has a first value, it is determined that the flight direction control instruction is generated on the basis of the polar coordinate system; and when the type identifier has a second value, it is determined that the flight direction control instruction is generated on the basis of a flight coordinate system of the aircraft, such that the flight direction control instruction is executed to drive the aircraft.

14. The apparatus according to claim 8, wherein in order to drive the aircraft to fly in accordance with the flight direction control instruction, the processor is configured to:
transform a target direction corresponding to the flight direction control instruction from the polar coordinate system to a flight coordinate system of the aircraft; and
drive the aircraft in accordance with the transformed target direction.

15. A non-transitory computer-readable storage medium having stored therein instructions that, when executed by a processor, cause the processor to perform a flight control method, the method comprising:
determining a positional relationship between an aircraft and a control device;
determining a polar coordinate system with the control device as an origin according to the positional relationship;
receiving a flight direction control instruction sent by the control device, the flight direction control instruction being generated on the basis of the polar coordinate system; and
driving, according to coordinate information about the aircraft in the polar coordinate system, the aircraft to fly in accordance with the flight direction control instruction,
wherein the determining the positional relationship between the aircraft and the control device comprises:
sensing a sensing signal transmitted by a signal transceiver device at the control device via a plurality of signal sensing devices installed at different positions on the aircraft;
comparing signal strengths of the sensing signal to determine a first signal sensing device corresponding to a strongest signal strength and a second signal sensing device corresponding to a lowest signal strength, wherein the first signal sensing device, the second signal sensing device, and the control device form a straight line, and the first signal sensing device and the control device are adjacent to each other on the straight line; and
determining the positional relationship according to installation positions of the first and second signal sensing devices on the aircraft; or
wherein the determining the positional relationship between the aircraft and the control device comprises:
simultaneously sending detection signals to a signal transceiver device at the control device via a plurality of signal transmitting devices installed at different positions on the aircraft;
determining a detection signal first received by the signal transceiver device and a detection signal last received by the signal transceiver device according to a response message returned from the signal transceiver device, to determine a first signal transmitting device corresponding to the detection signal first received by the signal transceiver device and a second signal transmitting device corresponding to the detection signal last received by the signal transceiver device, wherein the first signal transmitting device, the second signal transmitting device, and the control device form a straight line, and the first signal transmitting device and the control device are adjacent to each other on the straight line; and
determining the positional relationship according to installation positions of the first and second signal transmitting devices on the aircraft.

* * * * *